(12) United States Patent
Oh

(10) Patent No.: US 10,859,828 B2
(45) Date of Patent: Dec. 8, 2020

(54) SMART GLASSES

(71) Applicant: Richard Oh, Los Angeles, CA (US)

(72) Inventor: Richard Oh, Los Angeles, CA (US)

( * ) Notice: Subject to any disclaimer, the term of this patent is extended or adjusted under 35 U.S.C. 154(b) by 98 days.

(21) Appl. No.: 16/210,529

(22) Filed: Dec. 5, 2018

(65) Prior Publication Data

US 2019/0196191 A1 Jun. 27, 2019

(51) Int. Cl.
*G02B 27/01* (2006.01)
*B05B 9/08* (2006.01)
*G02C 11/00* (2006.01)
*G02C 11/06* (2006.01)
*G02C 5/00* (2006.01)
*B05B 1/00* (2006.01)

(52) U.S. Cl.
CPC .......... *G02B 27/017* (2013.01); *B05B 9/0833* (2013.01); *G02C 5/001* (2013.01); *G02C 11/06* (2013.01); *G02C 11/10* (2013.01); *B05B 1/005* (2013.01); *G02B 2027/0178* (2013.01); *G02C 2200/26* (2013.01)

(58) Field of Classification Search
CPC .... G02B 27/017; B05B 9/0833; G02C 5/001; G02C 11/06; G02C 11/10
USPC ........................................................ 351/158
See application file for complete search history.

(56) References Cited

U.S. PATENT DOCUMENTS

| | | | |
|---|---|---|---|
| 6,210,000 B1* | 4/2001 | Yee | A61B 5/411 351/83 |
| 2007/0046890 A1* | 3/2007 | Chen | G02C 5/14 351/120 |
| 2009/0207373 A1* | 8/2009 | Stinson | G02C 9/04 351/158 |
| 2009/0247967 A1* | 10/2009 | Delli Paoli, Jr. | A61M 16/107 604/300 |
| 2017/0278453 A1* | 9/2017 | Kurosaki | G06F 1/1656 |

* cited by examiner

*Primary Examiner* — James R Greece
(74) *Attorney, Agent, or Firm* — John K. Park; Park Law Firm

(57) ABSTRACT

Provided is smart glasses including a spectacle frame having a lens frame to which a pair of lenses or a display is coupled and a pair of spectacle temples which extends from both ends of the lens frame in one direction; a cartridge detachably mounted on the spectacle frame and in which a functional material contained; a spray nozzle which is provided at a nose pad portion of the lens frame and discharges the functional material contained in the cartridge to an outside; and a supply path formed inside the spectacle frame to supply the functional material from the cartridge to the spray nozzle.

16 Claims, 7 Drawing Sheets

SMART GLASSES

CROSS-REFERENCE TO RELATED APPLICATION

This application claims priority to and the benefit of Korean Patent Application No. 2017-0178062, filed on Dec. 22, 2017, the disclosure of which is incorporated herein by reference in its entirety.

BACKGROUND

1. Field of the Invention

The present invention relates to smart glasses capable of supplying ingredients such as oxygen, taurine, vitamin, and lutein to a wearer.

2. Discussion of Related Art

Smart devices such as smart phones and tablet PCs are a type of mobile electronic devices which can be used for long-distance and short-range wireless communication and are easy to use and highly portable.

In addition, recently, smart glasses, such as "Google Glasses" or "Sports Glasses", which are interlocked with the smart devices through wireless communication while being worn as a glasses type on a face of a user and can perform functions instead of the smart devices without directly using the smart devices have gained great popularity.

Such smart glasses are configured to be capable of providing various data through glass in the state in which the user wears them as glasses and providing functions of a mobile phone, a camera, and so on.

Meanwhile, since these smart glasses are fundamentally electronic devices, they generate electromagnetic waves or heat, may cause fatigue of the user and may cause headache or dry eye syndrome.

SUMMARY OF THE INVENTION

The present invention has been made in view of the above circumstances, and an object thereof is to provide smart glasses capable of maintaining and improving health of a user by providing functional ingredients, such as oxygen, taurine, vitamin and lutein, to the user.

To achieve the above-described object, the present invention provides smart glasses including a spectacle frame having a lens frame to which a pair of lenses or a display is coupled and a pair of spectacle temples which extends from both ends of the lens frame in one direction; a cartridge detachably mounted on the spectacle frame and in which a functional material is contained; a spray nozzle which is provided at a nose pad portion of the lens frame and discharges the functional material contained in the cartridge to an outside; and a supply path formed inside the spectacle frame to supply the functional material from the cartridge to the spray nozzle.

The spectacle frame may have a mounting groove formed in a side surface thereof such that at least two or more cartridges are mounted in a stacked manner, and a cartridge replacement unit which removes an exhausted cartridge and moves a new cartridge such that the new cartridge is connected to the supply path instead of the exhausted cartridge when the cartridge is exhausted may be provided in the mounting groove.

The cartridge replacement unit may include a stopper provided at an upper end of the mounting groove to be laterally slidable, a lever which operates the stopper 131 to be slidable, and an elastic member which is installed at a lower portion of the mourning groove and presses the cartridge upward, and when the cartridge located at the upper end of the mounting groove is exhausted, the exhausted cartridge may be discharged to an outside of the mounting groove by an operation of the lever, and the new cartridge may be pushed by the elastic member and may be connected to the supply path.

Alternatively, the spectacle frame may include a mounting groove in which a mounting cylinder formed so that a plurality of cartridges are mounted to be rotationally movable is provided, a cartridge replacement unit which rotates the mounting cylinder to rotationally move the exhausted cartridge and the new cartridge such that the new cartridge is connected to the supply path instead of the exhausted cartridge when the cartridge is exhausted may be included in the mounting groove, the cartridge replacement unit may include a pestle which is provided at an upper end of the mounting groove and slides laterally to punch a discharge port of the cartridge; a lever which is operable to allow the pestle to slide; and a gear portion which is coupled between the lever and the mounting cylinder to rotate the mounting cylinder at a predetermined angle in one sliding reciprocating movement of the lever, and during one sliding reciprocating movement of the lever, the cartridge located at the upper end of the mounting groove may be moved away from the pestle by rotation of the mounting cylinder, and a new cartridge may be disposed adjacent to the pestle and may be punched by the pestle.

The cartridge may include a first cartridge in which oxygen is contained, and a second cartridge in which at least one of taurine, vitamin, and lutein is contained, the first cartridge may be mounted on one side surface of the spectacle frame, and the second cartridge may be mounted on the other side surface of the spectacle frame, the supply path may include a first supply path connected to the first cartridge and a second supply path connected to the second cartridge, and the spray nozzle may include a first spray nozzle which is connected to the first cartridge and is stretchable to be exposed to an outside of the nose pad portion of the spectacle frame, and a second spray nozzle which is connected to the second cartridge and is stretchable to be exposed to an outside of the nose pad portion of the spectacle frame.

Alternatively, the cartridge may include a first cartridge in which oxygen is contained, and a second cartridge in which at least one of taurine, vitamin, and lutein is contained, the first cartridge may be mounted on one side surface of the spectacle frame, and the second cartridge may be mounted on the other side surface of the spectacle frame, the supply path may include a first supply path connected to the first cartridge and a second supply path connected to the second cartridge, and a mixing unit which mixes the materials supplied through the first supply path and the second supply path may be provided inside the spectacle frame, and as mixing ratio of the mixing unit may be adjustable.

The spectacle frame may include a solar light collecting panel and a battery, and the solar light collecting panel may be a transparent lens capable of being stacked in plural and amplifying light collecting efficiency.

A terminal which performs functions of a smart phone and a computer may be provided inside the spectacle frame, and a display capable of serving as a spectacle lens at normal times and switching to a screen showing contents of the terminal in operation may be provided at the lens frame.

The pair of spectacle temples may be divided into two drawable branching portions capable of being drawn out, and an earphone for the terminal may be provided at one of the two branching portions, and an earphone for hearing aid may be provided at the other one of the two branching portions.

The cartridge may include a first cartridge in which oxygen is contained, and a second cartridge in which at least one of taurine, vitamin, and lutein is contained, the first cartridge may be mounted on one side surface of the spectacle frame, and the second cartridge may be mounted on the other side surface of the spectacle frame, the supply path may include a first supply path connected to the first cartridge and a second supply path connected to the second cartridge, the first supply path and the second supply path may respectively include a first path which extends toward the nose pad portion of the spectacle frame, and a second path which extends toward a mouth of a user, and a gas pressure buffer device may be coupled to the first path and the second path, and the second path may be formed to be pivoted and seated inside the spectacle frame.

According to the present invention, during use of the smart glasses, a user may inhale functional ingredients such as oxygen, taurine, vitamin, and lutein contained in a cartridge, thereby restoring fatigue and promoting health. Further, when the cartridge containing the functional ingredients is exhausted, the cartridge can be replaced quickly and easily.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
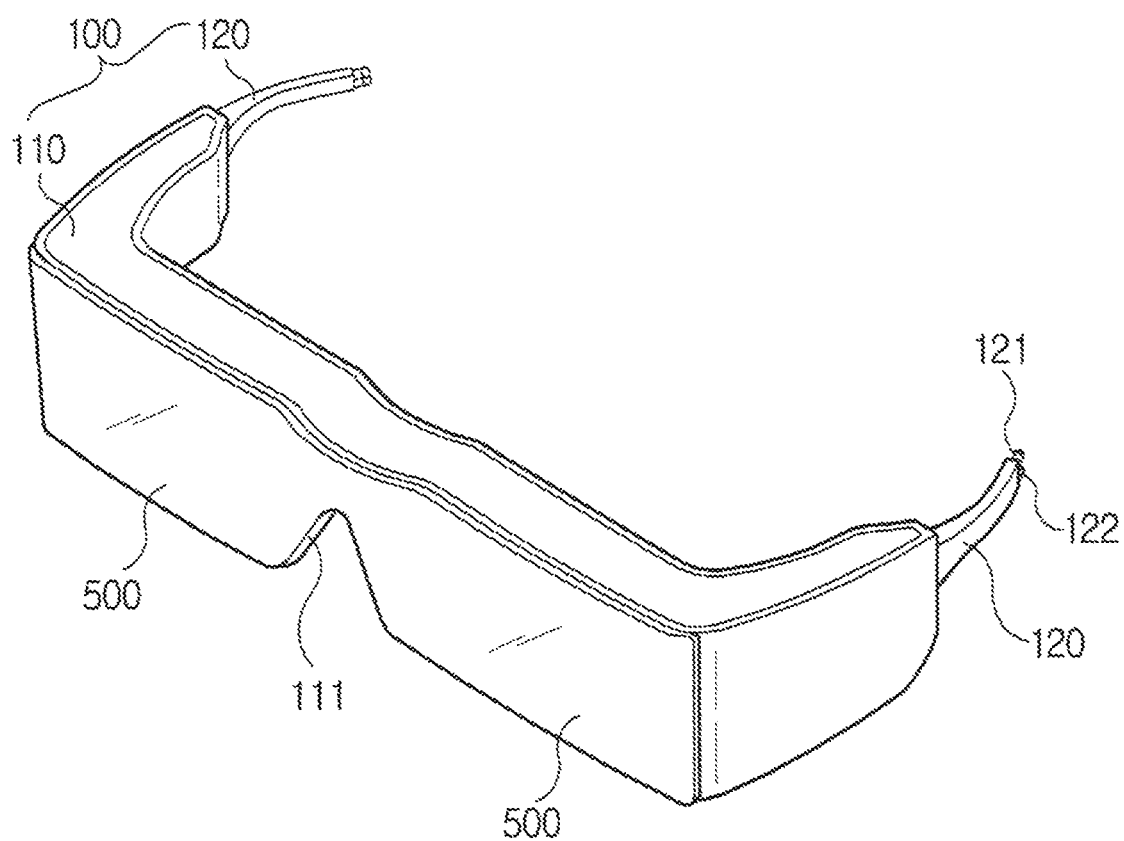
FIG. 1 is a perspective view schematically showing smart glasses according to the present invention.

Referring to FIGS. 1 to 7, smart glasses according to the present invention includes a spectacle frame 100 configured with a lens frame 110 and a pair of spectacle temples 120, a cartridge 200 mounted on the spectacle frame 100, a spray nozzle 300 formed on the spectacle frame 100, and a supply path 400 connecting the cartridge 200 with the spray nozzle 300.

A pair of lenses or a display 500 is coupled to the lens frame 110 of the spectacle frame 100. The pair of spectacle temples 120 extending in one direction are provided at both ends of the lens frame 110.

The cartridge 200 is detachably provided on a side surface of the spectacle frame 100. The cartridge 200 may be configured with a pressure vessel in which a functional material is contained. Additionally, the functional material contained in the cartridge 200 has ingredients, such as oxygen, taurine, vitamin and lutein, which are beneficial to a human body and can be stored in the cartridge 200 in a gas state having a predetermined pressure.

The spray nozzle 300 serves to discharge the gaseous functional material contained in the cartridge 200 to the outside of the spectacle frame 100. The spray nozzle 300 is provided on a nose pad portion 111 of the lens frame 110 and discharges the functional material to the nose of a wearer wearing the smart glasses according to the present invention, thereby allowing the user to inhale the functional material. Here, a valve for opening and closing the spray nozzle 300 and an operation button for operating the valve may be provided on the spectacle frame 100.

The supply path 400 may be embedded as a separate tube in the spectacle frame 100 or may be formed by a flow path formed in the spectacle frame 100. One end of the supply path 400 is connected to the cartridge 200, and the other end thereof is connected to the spray nozzle 300 to supply the functional material contained in the cartridge 200 to the side of the spray nozzle 300.

Figure 2:
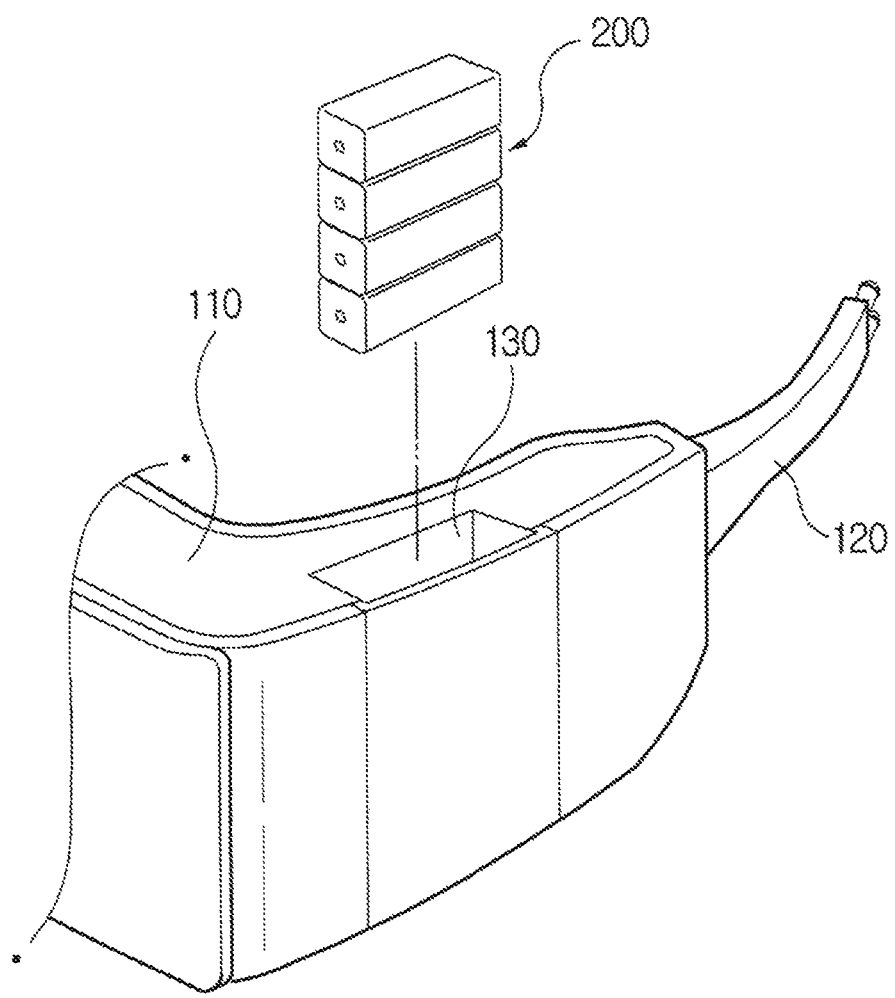
FIG. 2 is a view showing a mounting groove formed in a spectacle frame of FIG. 1 and a cartridge mounted in the mounting groove.
Figure 3:
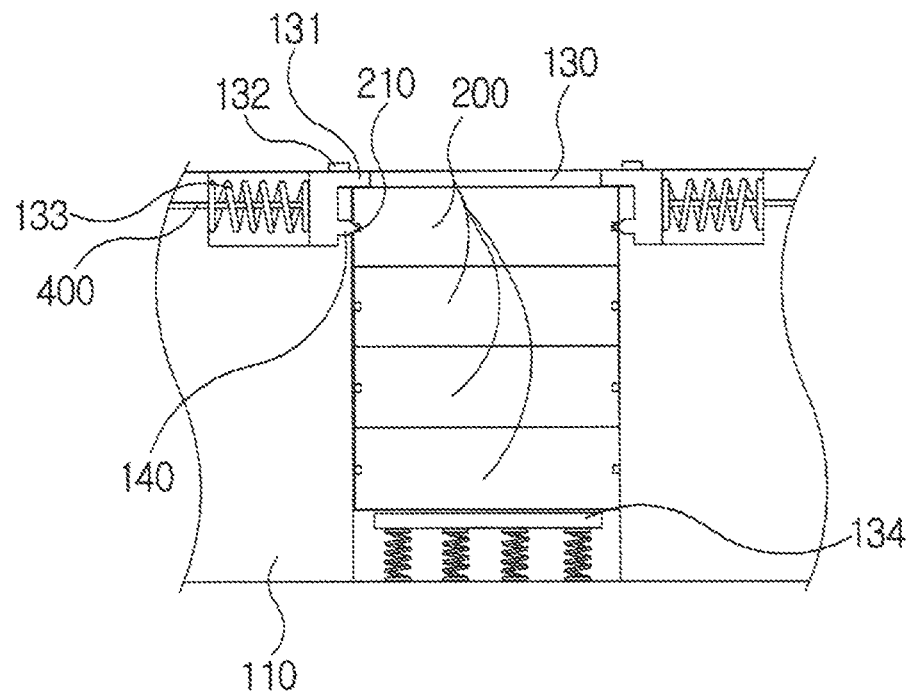
FIG. 3 is a side cross-sectional view of FIG. 2

Referring to FIGS. 2 and 3, the lens frame 110 of the spectacle frame 100 has a mounting groove 130, in which the cartridge 200 is mounted, in a side surface thereof. The mounting groove 130 is formed so that a part of a side surface of the spectacle frame 100 and an upper surface thereof are opened and the cartridge 200 is inserted and mounted from an upper side of the mounting groove 130 to a lower side thereof. Of course, the cartridge 200 may be configured to be inserted from the lower side of the mounting groove 130 to the upper side thereof. At this time, it is preferable that the cartridges 200 are stacked in two or more layers and mounted in the mounting groove 130. A connection portion 140 connected to the supply path 400 is provided on an upper portion of an inner side surface of the mounting groove 130, and the cartridge 200 has a discharge port connected to the correction portion 140 so that the contained functional material is discharged to the side of the supply path 400. Here, the connection portion 140 may be formed in a protrusion shape which presses a discharge port 210 of the cartridge 200, and the discharge port 210 of the cartridge 200 may have a structure which is pressed and opened by the protrusion of the connection portion 140. At this time, a rupturable membrane which is ruptured by the protrusion of the connection portion 140 and allows the functional material therein to be discharged may be provided at the discharge port 210. That is, the protrusion of the connection portion 140 serves to punch the discharge port 210 of the cartridge 200.

Further, a cartridge replacement unit for removing the exhausted cartridge and moving a new cartridge so that the new cartridge is connected to the supply path 400 instead of the exhausted cartridge when the cartridge 200 is exhausted is provided in the mounting groove 130.

Specifically, the cartridge replacement unit includes a stopper 131 provided at an end of the mounting groove 130, a lever 132 for moving the stopper 131, and an elastic member 133 for pressing the stopper 131 toward the cartridge 200. The stopper 131 is formed to be slidable into the spectacle frame 100 in the lateral direction at the upper end of the mounting groove 130. An elastic member 133 such as a spring is installed at a lateral end of the stopper 131, and the elastic member 133 presses the stopper 131 so that the stopper 131 protrudes toward the inside of the mounting groove 130. The lever 132 is integrally formed with the stopper 131 at the upper portion of the stopper 131, and the stopper 131 can be slid laterally by a lever operation of the user. The elastic member 133 presses the cartridges 200 inserted in the mounting groove 130 upward. A pressing pad 134 is installed at the upper portion of the elastic member 133, and the pressing pad 134 pushes up the cartridge 200 using an elastic force of the elastic member 133. At this time, the cartridge 200 is not separated from the mounting groove 130 by the stopper 131 formed at the upper end of the mounting groove 130. Additionally, the discharge port 210 of the cartridge 200 located at the uppermost portion inside the mounting groove 130 is connected to the connection portion 140 so that the functional material can be discharged to the side of the supply path 400.

Due to such a configuration, in the case in which the cartridge 200 located at the uppermost portion of the mounting groove 130 is exhausted, when the user operates the lever 132 in the lateral direction, the stopper 131 is slid into the spectacle frame 100, and the cartridges 200 are pushed upward by the elastic force of the elastic member 133. Thereafter, the user can remove the uppermost cartridge 200 from the mounting groove 130 and then stop the operating of the lever 132. Then, the new cartridge immediately below the exhausted cartridge moves upward, the discharge port 210 of the new cartridge is connected to the connection portion 140, and thus the functional material can be discharged to the side of the supply path 400.

Although the above-described cartridge replacement unit is a manual configuration which is operated by an operation of the user, the cartridge replacement unit may alternatively be an automatic configuration. For example, the cartridge replacement unit may include a sensor which senses a weight of the respective cartridges, a release mechanism which is driven to discharge the exhausted cartridge to the outside of the mounting groove 130 according to the detection result of the sensor, and an elastic member which is installed at the lower portion of the mounting groove 130 to press the cartridge upward. In this case, the release mechanism may be configured to slide the above-described stopper 131 by driving of the motor.

Further, the cartridge replacement unit may be configured by adding the sensor for sensing the weight of the cartridge to the above-described manual configuration.

In this way, during use of the smart glasses according to the present invention, the user can inhale ingredients such as oxygen, taurine, vitamin, and lutein contained in the cartridge 200, thereby restoring fatigue and promoting health. Furthermore, when the cartridge 200 in which the functional material is contained is exhausted, the cartridge can be replaced easily and quickly.

Figure 4A:
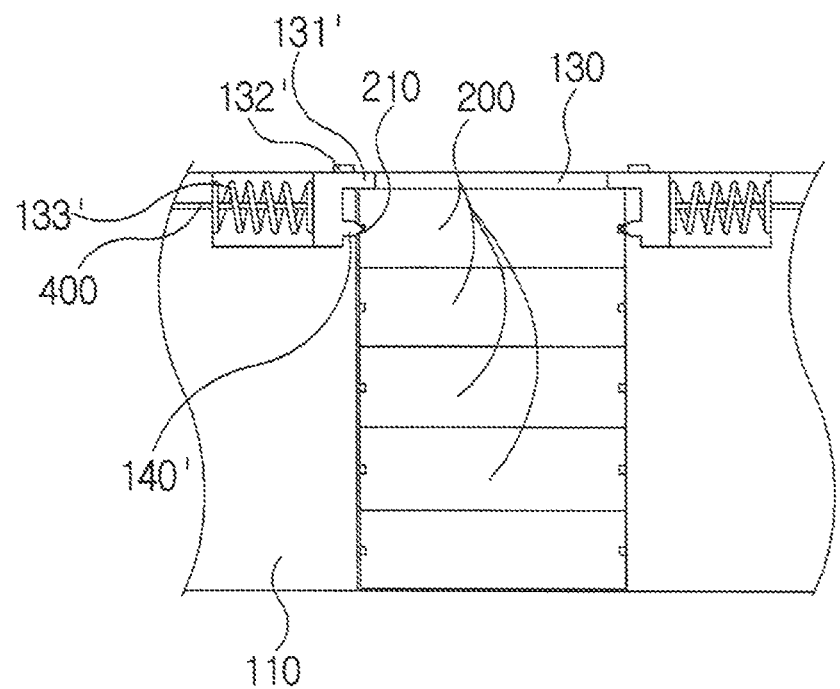
FIGS. 4a and 4b are diagrams showing alternative examples of a cartridge replacement unit of the smart glasses according to the present invention.
Figure 4B:
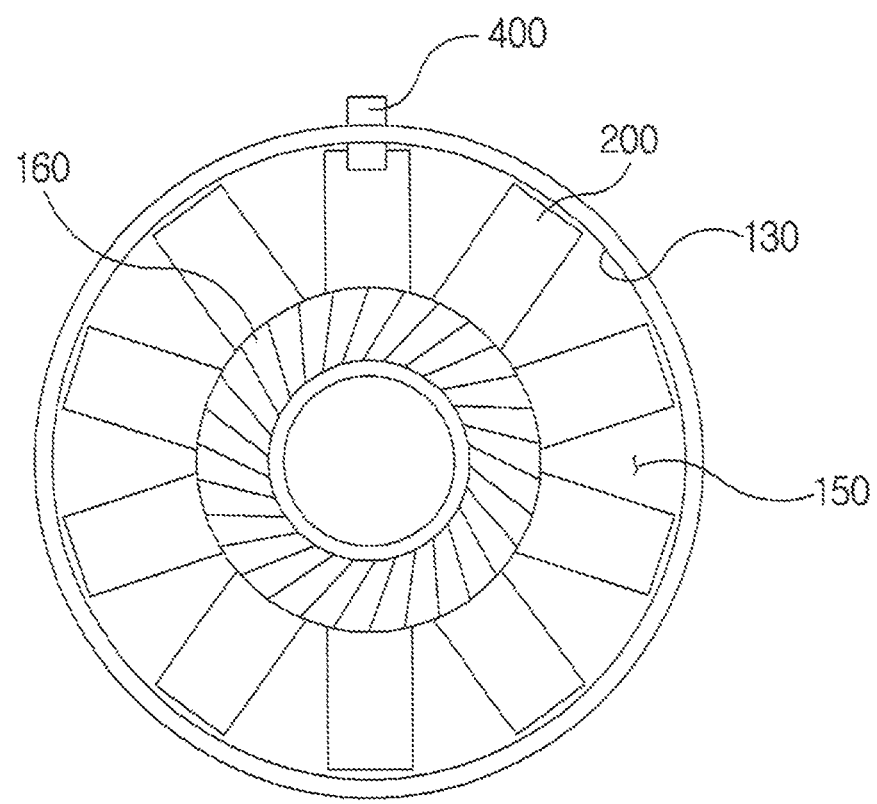

Alternatively, referring to FIGS. 4a and 4b, the spectacle frame 100 has the mounting groove 130 in which a mounting cylinder 150 formed so that a plurality of, for example, ten cartridges 200 are mounted to be rotationally movable is provided. Additionally, the cartridge replacement unit (not shown) which rotates the mounting cylinder 150 to rotationally move the exhausted cartridge and the new cartridge such that the new cartridge is connected to the supply path 400 instead of the exhausted cartridge when one cartridge is exhausted is included in the mounting groove 130. Here, the cartridge replacement unit is configured to rotate the mounting cylinder 150 in a revolver manner.

Specifically, a pestle 131' having a shape similar to the above-described stopper 131 is provided at the upper end of the mounting groove 130. This pestle 131' is pressed by an elastic member 133' and slides laterally to punch the discharge port 210 of the cartridge 200 located at the upper end of the mounting groove 130. Also, a lever 132' is provided on the upper portion of the pestle 131' to allow the pestle 131' to move in the lateral direction due to the operation of the user. In addition, a connection portion 140' in the form of a protrusion for punching the discharge port 210 of the cartridge 200 is provided at the lower portion of the pestle 131'. Additionally, a gear portion 160 is coupled between the mounting cylinder 150 and the lever 132'. The gear portion 160 can be coupled between the mounting cylinder 150 and the lever 132' using connecting gears (not shown). Here, the gear portion 160 rotates the mounting cylinder 150 by a predetermined angle when the lever 132' retreats from a home position due to the operation of the user. For example, in the case of the mounting cylinder 150 which accommodates 10 cartridges, the mounting cylinder 150 rotates by 36 degrees when the lever 132' retracts. Then, the exhausted cartridge, i.e., the cartridge at the upper end of the mounting groove 130 is moved away from the pestle 131', and a new cartridge is placed adjacent to the pestle 131'. And when the user releases his/her hand from the lever 132' in the retracted position, the pestle 131' punches the discharge port 210 of the new cartridge by the elastic force of the elastic member 133'.

In this way, the above-described cartridge replacement unit can rotate the cartridges 200 in the revolver manner, thereby easily replacing the cartridges.

Figure 5:
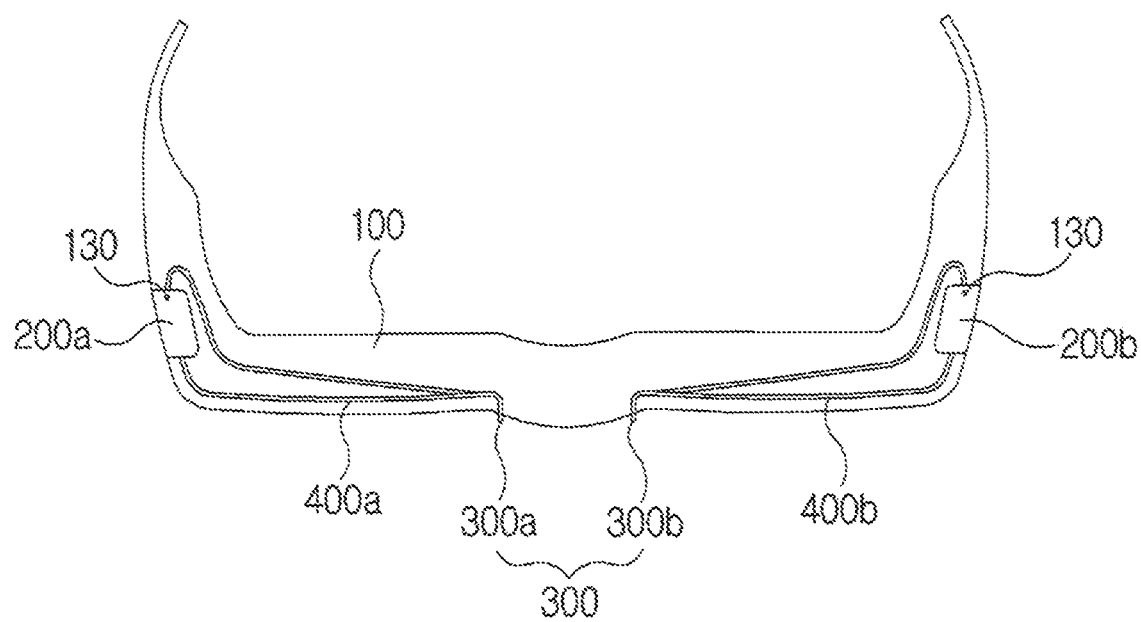
FIG. 5 is a plan view schematically showing the smart glasses according to the present invention.

Referring to FIG. 5, the mounting grooves 130 in which the cartridges 200 are mounted are provided on one side and the other side of the spectacle frame 100, respectively. Also, the cartridge 200 includes a first cartridge 200a containing oxygen, and a second cartridge 200b containing at least one of taurine, vitamin and lutein, and the first cartridge 200a is mounted in the mounting groove 130 formed in one side surface of the spectacle frame 100, and the second cartridge 200b is mounted in the mounting groove 130 formed in the other side surface of the spectacle frame 100. Further, the supply path 400 includes a first supply path 400a connected to the first cartridge 200a, and a second supply path 400b connected to the second cartridge 200b. The spray nozzle 300 includes a first spray nozzle 300a connected to the first cartridge 200a and a second spray nozzle 300b connected to the second cartridge 200b. Here, one first spray nozzle 300a and one second spray nozzle 300b are provided at the nose pad portion of the spectacle frame 100. In addition, the first spray nozzle 300a and the second spray nozzle 300b are configured to be stretchable so as to be exposed to the outside of the nose pad portion of the spectacle frame 100. That is, the spray nozzle 300 is formed in a telescopic type and can extend outward only in use.

Figure 6:
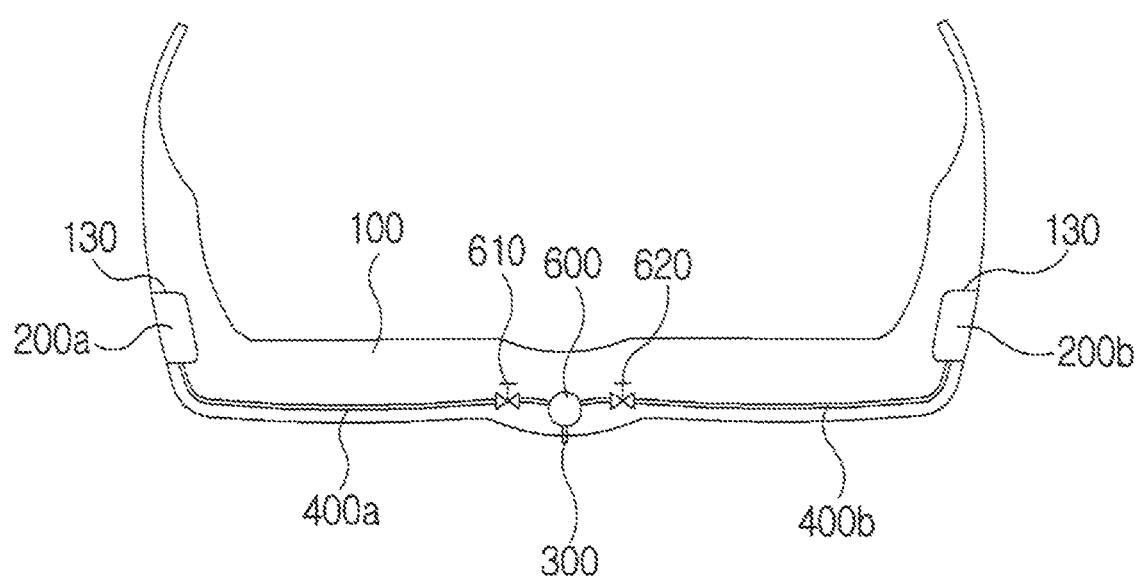
FIG. 6 is a diagram showing an alternative embodiment of FIG. 5.

Referring to FIG. 6, the mounting grooves 130 in which the cartridges 200 are mounted are provided on one side and the other side of the spectacle frame 100, respectively. Also, the cartridge 200 includes the first cartridge 200a containing oxygen, and the second cartridge 200b containing at least one of taurine, vitamin and lutein, and the first cartridge 200a is mounted in the mounting groove 130 formed in one side surface of the spectacle frame 100, and the second cartridge 200b is mounted in the mounting groove 130 formed in the other side surface of the spectacle frame 100. And the supply path 400 includes the first supply path 400a connected to the first cartridge 200a, and the second supply path 400b connected to the second cartridge 200b.

Here, a mixing unit 600 for mixing materials supplied through the first supply path 400a and the second supply path 400b is provided inside the spectacle frame 100. The mixing unit 600 is configured to control a mixing ratio of the functional material of the first cartridge 200a and the functional material of the second cartridge 200b. The control of the mixing ratio can be adjusted by adjusting opening and closing times of on/off valves 610 and 620 opening and closing the first supply path 400a and the second supply path 400b connected to the mixing unit 600. Additionally, the opening and closing of the on/off valves 610 and 620 may be controlled by an operation of a touch button provided on the spectacle frame 100 so that the mixing ratio of the mixing unit 600 can be adjusted.

Figure 7:
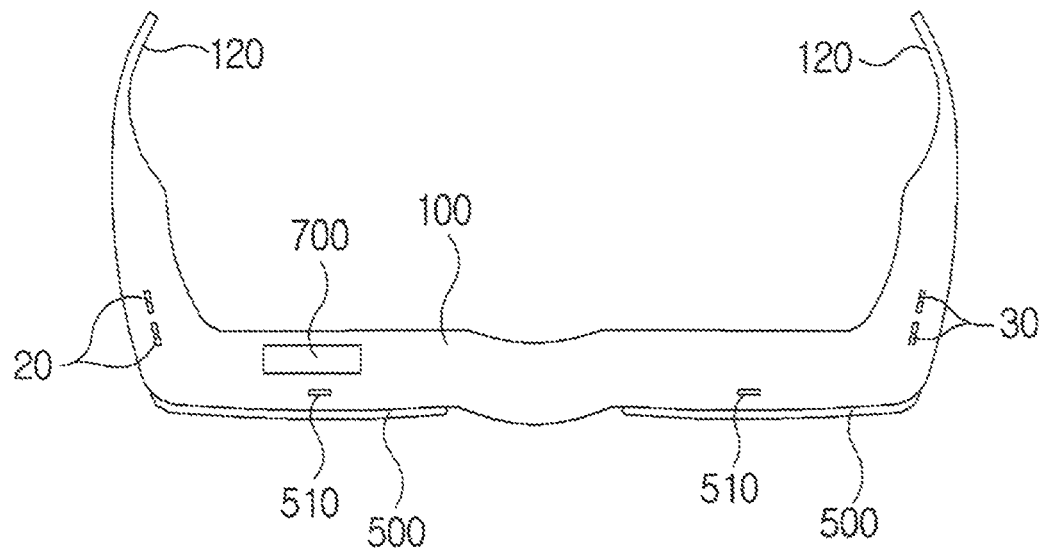
FIG. 7 is a plan view schematically showing an additional embodiment of the small glasses according to the present invention.

On the other hand, the spectacle frame 100 may include a solar light collecting panel and a battery 700, and the battery 700 is configured to provide electric power to parts of the smart glasses which require electrical energy (refer to FIG. 7).

Here, the solar light collecting panel may be formed of a transparent material such as a lens which is stacked in plural on a surface of the spectacle frame 100 to amplify light collecting efficiency of sunlight.

Referring to FIG. 7, the smart glasses according to the present invention may include a terminal (not shown) capable of performing functions of a smart phone and a computer. This terminal is built in the spectacle frame 100. For example, the smart glasses according to the present invention can perform functions such as data storage memory, voice recording, video recording, web surfing, and voice reception and transmission.

Also, a display 500 which serves as a spectacle lens at normal times and can be switched to a screen showing contents and data of the terminal in operation is provided at the lens frame 110 of the spectacle frame 100. Further, brightness of the display 500 can be adjusted to perform a sunglasses function. Here, the function selection of the terminal and the switching of the display 500 are performed by a touch operation buttons 510 provided on the upper surface of the spectacle frame 100.

On the other hand, each of the pair of spectacle temples 120 is divided into two branching portions, and an earphone 121 for a terminal is provided at one of the two branching portions, and an earphone 122 for hearing aid is provided at the other one of the two branching portions (refer to FIG. 1). The branching portions may be formed of drawable wires. Here, electric power and volume of the earphones 121 and 122 can be controlled by touch buttons 20 provided on the spectacle frame 100. Meanwhile, a reference numeral 30 indicates a touch button for operating the function of the terminal.

Figure 8:
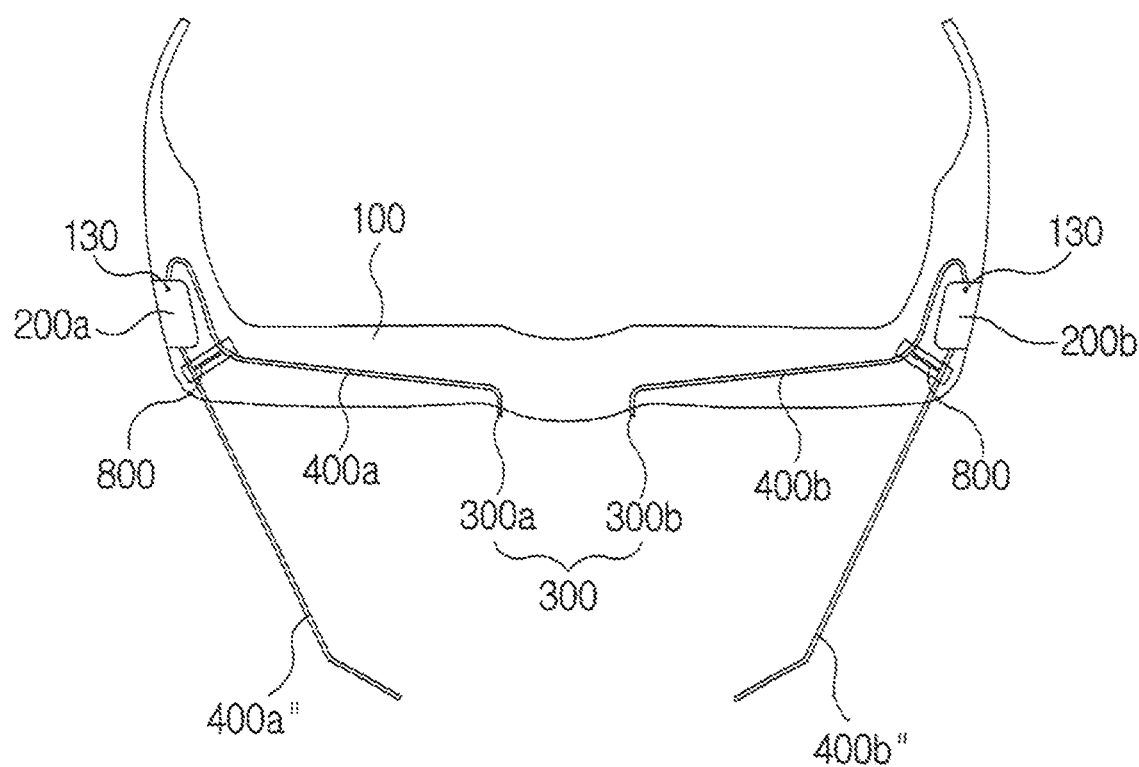
FIGS. 8 and 9 are plan views schematically showing another additional embodiment of the smart glasses according to the present invention.

Referring to FIG. 8, the smart glasses according to the present invention may include first paths 400a' and 400b' through which the supply paths 400a and 400b connected to the cartridges 200a and 200b extend toward the nose of the user, and second paths 400a" and 400b" through which the supply paths 400a and 400b connected to the cartridges 200a and 200b extend toward the mouth of the user.

Here, the second paths 400a" and 400b" extend a predetermined length downward from the spectacle frame 100 and are configured to be stretchable in telescopic type such that a length thereof can be varied. Also, the second paths 400a" and 400b" may be configured with a plurality of portions connected in a tubing manner.

Such second paths 400a" and 400b" are useful for patients requiring direct treatment by allowing the functional materials to be supplied directly into the patient's mouth. On the other hand, when the functional material is supplied to a patient, a large amount of functional material is required, and thus the cartridges 200a and 200b may not cope with a sufficient amount. Therefore, a separate storage container (not shown) storing a large amount of functional material may be connected to the cartridge. For example, the storage container can be used in hospitals in which patients are accommodated.

Preferably, the smart glasses according to the present invention may further include a gas pressure buffer device 800 which buffers a pressure of a functional material gas supplied from the cartridges 200a and 200b to the side of the supply paths 400a and 400b. The gas pressure buffer device 80 may be connected to the first paths 400a' and 400b' and the second paths 400a" and 400b" to buffer the pressure of the gas discharged to the nozzle side to some extent. For example, the gas pressure buffer device 800 is configured as a buffer having a predetermined space and can serve to reduce the pressure of the gas discharged from the cartridge.

Figure 9:
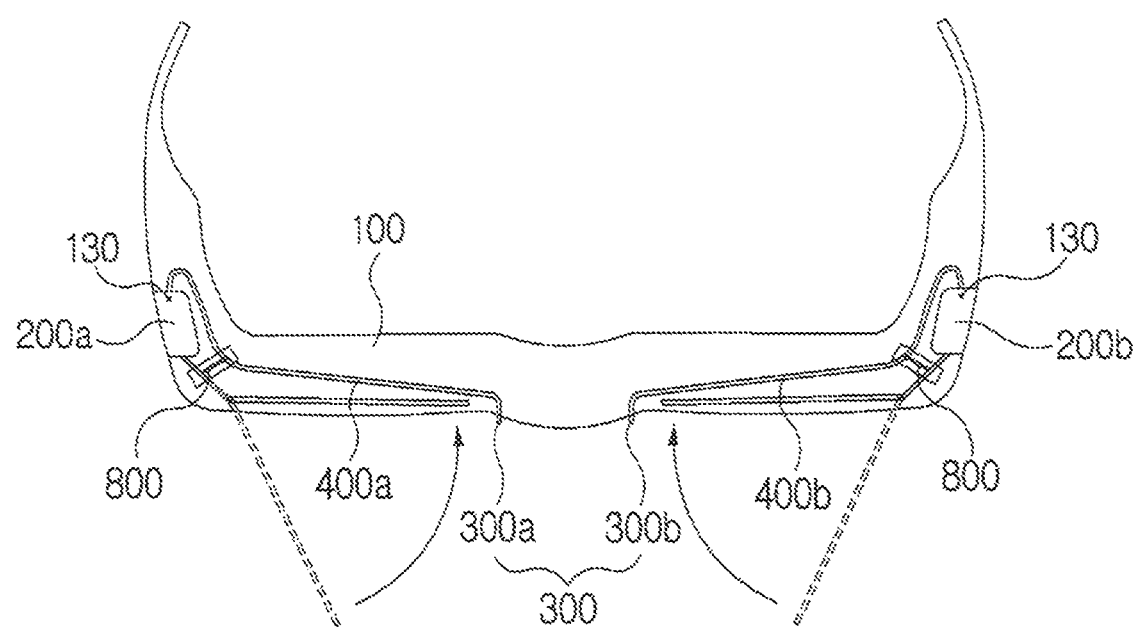

Meanwhile, referring to FIG. 9, the above-described second paths 400a" and 400b" may be configured to be pivoted toward the spectacle frame 100 and to be seated inside the spectacle frame 100.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. Smart glasses comprising:
   a spectacle frame having a lens frame to which a pair of lenses or a display is coupled and a pair of spectacle temples which extends from both ends of the lens frame;
   a cartridge detachably mounted on the spectacle frame and in which a functional material is contained;
   a spray nozzle which is provided at a nose pad portion of the lens frame and discharges the functional material contained in the cartridge to an outside; and
   a supply path formed inside the spectacle frame to supply the functional material from the cartridge to the spray nozzle,
   wherein the spectacle frame has a mounting groove formed in a side surface thereof such that at least two or more cartridges are mounted in a stacked manner, and
   a cartridge replacement unit which removes an exhausted cartridge and moves a new cartridge such that the new cartridge is connected to the supply path instead of the exhausted cartridge when the cartridge is exhausted is provided in the m mounting groove.

2. The smart glasses of claim 1, wherein the cartridge replacement unit includes a stopper provided at an upper end of the mounting groove to be laterally slidable, a lever which operates the stopper to be slidable, and an elastic member which is installed at a lower portion of the mounting groove and presses the cartridge upward, and when the cartridge located at the upper end of the mounting groove is exhausted, the exhausted cartridge is discharged to an outside of the mounting groove by an operation of the lever, and the new cartridge is pushed by the elastic member and connected to the supply path.

3. Smart glasses comprising:
a spectacle frame having a lens frame to which a pair of lenses or a display is coupled and a pair of spectacle temples which extends from both ends of the lens frame;
a cartridge detachably mounted on the spectacle frame and in which a functional material is contained;
a spray nozzle which is provided at a nose pad portion of the lens frame and discharges the functional material contained in the cartridge to an outside; and
a supply path formed inside the spectacle frame to supply the functional material from the cartridge to the spray nozzle,
wherein the spectacle frame includes a mounting groove in which a mounting cylinder formed so that a plurality of cartridges are mounted to be rotationally movable is provided,
a cartridge replacement unit which rotates the mounting cylinder to rotationally move the exhausted cartridge and the new cartridge such that the new cartridge is connected to the supply path instead of the exhausted cartridge when the cartridge is exhausted is included in the mounting groove,
the cartridge replacement unit includes a pestle which is provided at an upper end of the mounting groove and slides laterally to punch a discharge port of the cartridge; a lever which is operable to allow the pestle to slide; and a gear portion which is coupled between the lever and the mounting cylinder to rotate the mounting cylinder at a predetermined angle in one sliding reciprocating movement of the lever, and
during one sliding reciprocating movement of the lever, the cartridge located at the upper end of the mounting groove is moved away from the pestle by rotation of the mounting cylinder, and a new cartridge is disposed adjacent to the pestle and punched by the pestle.

4. Smart glasses comprising:
a spectacle frame having a lens frame to which a pair of lenses or a display is coupled and a pair of spectacle temples which extends front both ends of the lens frame;
a cartridge detachably mounted on the spectacle frame and in which a functional material is contained;
a spray nozzle which is provided at a nose pad portion of the lens frame and discharges the functional material contained in the cartridge to an outside; and
a supply path formed inside the spectacle frame to supply the functional material from the cartridge to the spray nozzle,
wherein the cartridge includes a first cartridge in which oxygen is contained, and a second cartridge in which at least one of taurine, vitamin, and lutein is contained,
the first cartridge is mounted on one side surface of the spectacle frame, and the second cartridge is mounted on the other side surface of the spectacle frame,
the supply path includes a first supply path connected to the first cartridge and a second supply path connected to the second cartridge, and
the spray nozzle includes a first spray nozzle which is connected to the first cartridge and is stretchable to be exposed to an outside of the nose pad portion of the spectacle frame, and a second spray nozzle which is connected to the second cartridge and is stretchable to be exposed to an outside of the nose pad portion of the spectacle frame.

5. Smart glasses comprising:
a spectacle frame having a lens frame to which a pair of lenses or a display is coupled and a pair of spectacle temples which extends from both ends of the lens frame;
a cartridge detachably mounted on the spectacle frame and in which a functional material is contained;
a spray nozzle which is provided at a nose pad portion of the lens frame and discharges the functional material contained in the cartridge to an outside; and
a supply path formed inside the spectacle frame to supply the functional material from the cartridge to the spray nozzle,
wherein the cartridge includes a first cartridge in which oxygen is contained, and a second cartridge in which at least one of taurine, vitamin, and lutein is contained,
the first cartridge is mounted on one side surface of the spectacle frame, and the second cartridge is mounted on the other side surface of the spectacle frame,
the supply path includes a first supply path connected to the first cartridge and a second supply path connected to the second cartridge, and
a mixing unit which mixes the materials supplied through the first supply path and the second supply path is provided inside the spectacle frame, and a mixing ratio of the mixing unit is adjustable.

6. Smart glasses comprising:
a spectacle frame having a lens frame to which a pair of lenses or a display is coupled and a pair of spectacle temples which extends from both ends of the lens frame;
a cartridge detachably mounted on the spectacle frame and in which a functional material is contained;
a spray nozzle which is provided at a nose pad portion of the lens frame and discharges the functional material contained in the cartridge to an outside; and
a supply path formed inside the spectacle frame to supply the functional material from the cartridge to the spray nozzle, wherein the cartridge includes a first cartridge in which oxygen is contained, and a second cartridge in which at least one of taurine, vitamin, and lutein is contained, the first cartridge is mounted on one side surface of the spectacle frame, and the second cartridge is mounted on the other side surface of the spectacle frame, the supply path includes a first supply path connected to the first cartridge and a second supply path connected to the second cartridge.

7. The smart glasses of claim 1, wherein the spectacle frame includes a solar light collecting panel and a battery, and
the solar light collecting panel is a transparent lens capable of being stacked in plural and amplifying light collecting efficiency.

8. The smart glasses of claim 1, wherein a terminal which performs functions of a smart phone and a computer is provided inside the spectacle frame, and
a display capable of serving as a spectacle lens at normal times and switching to a screen showing contents of the terminal in operation is provided at the lens frame.

9. The smart glasses of claim 1, wherein the pair of spectacle temples are divided into two drawable branching portions capable of being drawn out, and an earphone for the terminal is provided at one of the two branching portions, and an earphone for hearing aid is provided at the other one of the two branching portions.

10. The smart glasses of claim 3, wherein the spectacle frame includes a solar light collecting panel and a battery, and the solar light collecting panel is a transparent lens capable of being stacked in plural and amplifying light collecting efficiency.

11. The smart glasses of claim 3, wherein a terminal which performs functions of a smart phone and a computer is provided inside the spectacle frame, and a display capable of serving as a spectacle lens at normal times and switching to a screen showing contents of the terminal in operation is provided at the lens frame.

12. The smart glasses of claim 3, wherein the pair of spectacle temples are divided into two drawable branching portions capable of being drawn out, and an earphone for the terminal is provided at one of the two branching portions, and an earphone for hearing aid is provided at the other one of the two branching portions.

13. The smart glasses of claim 4, wherein the spectacle frame includes a solar light collecting panel and a battery, and the solar light collecting panel is a transparent lens capable of being stacked in plural and amplifying light collecting efficiency.

14. The smart glasses of claim 5, wherein the spectacle frame includes a solar light collecting panel and a battery, and the solar light collecting panel is a transparent lens capable of being stacked in plural and amplifying light collecting efficiency.

15. The smart glasses of claim 5, wherein a terminal which performs functions of a smart phone and a computer is provided inside the spectacle frame, and a display capable of serving as a spectacle lens at normal times and switching to a screen showing contents of the terminal in operation is provided at the lens frame.

16. The smart glasses of claim 5, wherein the pair of spectacle temples are divided into two drawable branching portions capable of being drawn out, and an earphone for the terminal is provided at one of the two branching portions, and an earphone for hearing aid is provided at the other one of the two branching portions.

* * * * *